US012469246B1

(12) United States Patent
Jansen dos Reis et al.

(10) Patent No.: US 12,469,246 B1
(45) Date of Patent: Nov. 11, 2025

(54) DEPTH-BASED VISUAL SEARCH AREA

(71) Applicant: Apple Inc., Cupertino, CA (US)

(72) Inventors: Paulo R. Jansen dos Reis, San Jose, CA (US); Christopher D. Fu, Fremont, CA (US)

(73) Assignee: APPLE INC., Cupertino, CA (US)

( * ) Notice: Subject to any disclaimer, the term of this patent is extended or adjusted under 35 U.S.C. 154(b) by 394 days.

(21) Appl. No.: 18/111,797

(22) Filed: Feb. 20, 2023

Related U.S. Application Data

(60) Provisional application No. 63/314,203, filed on Feb. 25, 2022.

(51) Int. Cl.
*G06V 10/22* (2022.01)
*G06F 3/01* (2006.01)
*G06T 7/50* (2017.01)
*G06T 7/80* (2017.01)
*G06V 10/26* (2022.01)

(52) U.S. Cl.
CPC ............ *G06V 10/235* (2022.01); *G06F 3/013* (2013.01); *G06T 7/50* (2017.01); *G06T 7/80* (2017.01); *G06V 10/26* (2022.01)

(58) Field of Classification Search
None
See application file for complete search history.

(56) References Cited

U.S. PATENT DOCUMENTS

| 10,650,590 | B1 | 5/2020 | Topiwala et al. | |
|---|---|---|---|---|
| 2016/0313902 | A1* | 10/2016 | Hill | G06F 3/0482 |
| 2017/0301147 | A1* | 10/2017 | Hurter | G06T 19/20 |
| 2018/0048823 | A1 | 2/2018 | Kang et al. | |
| 2018/0061116 | A1* | 3/2018 | Mitchell | G06F 3/011 |
| 2020/0076998 | A1* | 3/2020 | Gusstafsson | G06F 3/013 |
| 2021/0014469 | A1 | 1/2021 | Hur et al. | |
| 2021/0090333 | A1* | 3/2021 | Ravasz | G02B 27/01 |
| 2021/0141450 | A1* | 5/2021 | Melakari | H04N 7/0127 |
| 2023/0119935 | A1* | 4/2023 | Sztuk | G02B 27/0172 |
| | | | | 345/8 |

OTHER PUBLICATIONS

Allen, R. E., editor. "Distance1." The Penguin English Dictionary, 3rd ed., Penguin, 2007. Credo Reference, https://search.credoreference.com/articles/Qm9va0FydGljbGU6MjlwODU3MA==?aid=279753 (Year: 2007).*

* cited by examiner

*Primary Examiner* — Amandeep Saini
*Assistant Examiner* — Caroline Tabancay Duffy
(74) *Attorney, Agent, or Firm* — Fernando & Partners, LLP

(57) ABSTRACT

In one implementation, a method of extracting information from a physical environment is performed at a device including an image sensor, one or more processors, and non-transitory memory. The method includes determining a gaze location and a distance to an object in a physical environment at the gaze location. The method includes selecting a field-of-view of the physical environment based on the gaze location and the distance to the object. The method includes obtaining, using the image sensor, an image corresponding to the field-of-view of the physical environment. The method includes extracting information from the image.

20 Claims, 11 Drawing Sheets

500

At a device including an image sensor, one or more processors, and non-transitory memory:

Determining a gaze location and a distance to an object in a physical environment at the gaze location  ⸺510

Selecting a field-of-view of the physical environment based on the gaze location and the distance to an object  ⸺520

Capturing, using the image sensor, an image corresponding to the field-of-view of the physical environment  ⸺530

Extracting information from the image  ⸺540

Figure 5

DEPTH-BASED VISUAL SEARCH AREA

CROSS-REFERENCE TO RELATED APPLICATIONS

This application claims priority to U.S. Provisional Patent App. No. 63/314,203, filed on Feb. 25, 2022, which is hereby incorporated by reference in its entirety.

TECHNICAL FIELD

The present disclosure generally relates to systems, methods, and devices for extracting information from images of an environment.

BACKGROUND

An electronic device equipped with a camera can extract information from images of an environment, such as reading machine-readable text and detecting objects and/or contexts. However, in various implementations, extracting such information from the entire image can be computationally expensive.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of extracting information from an image of environment in accordance with some implementations.

Figure 1:
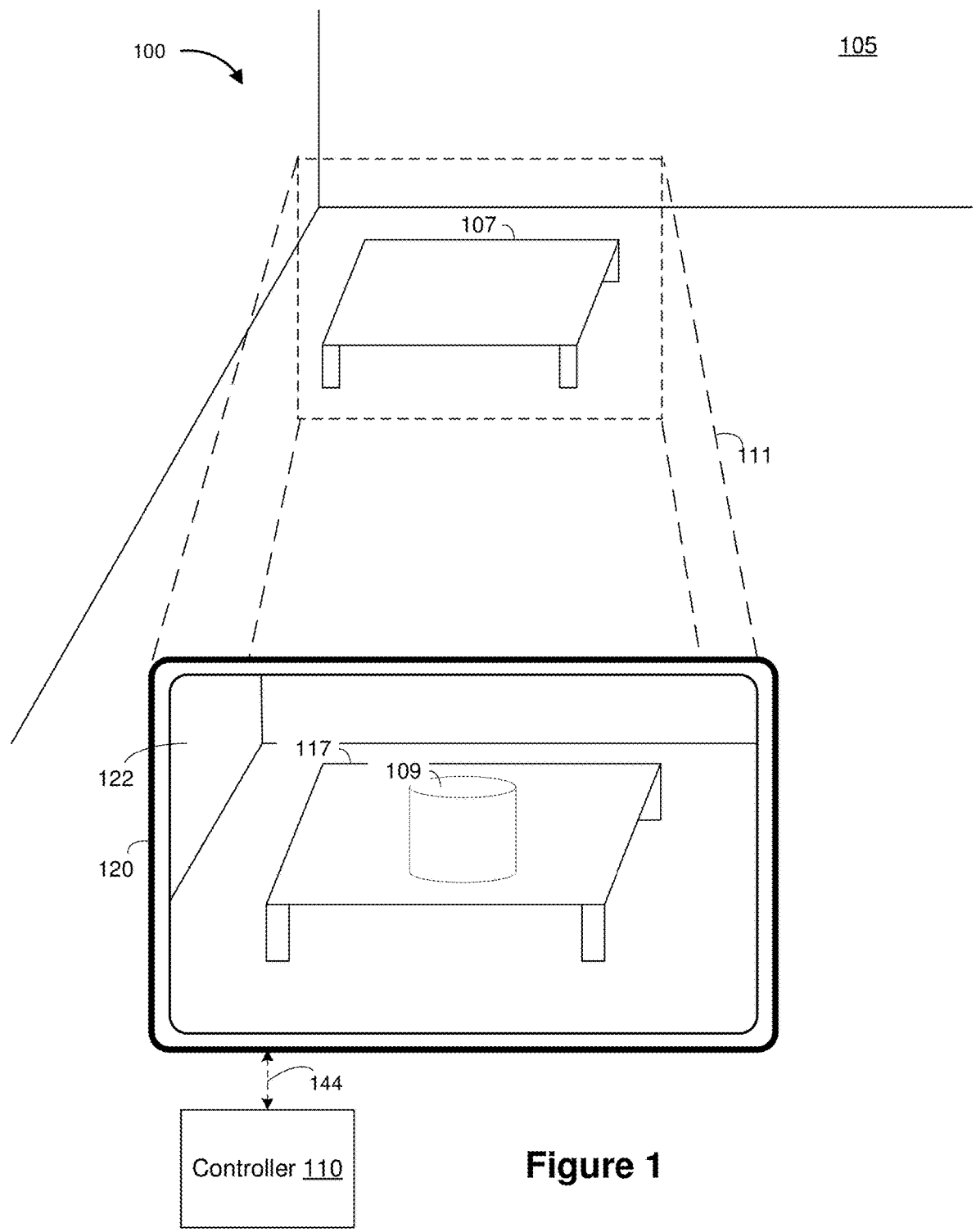
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for extracting information from a physical environment. In various implementations, the method is performed by a device including an image sensor, one or more processors, and non-transitory memory. The method includes determining a gaze location and a distance to an object in a physical environment at the gaze location. The method includes selecting a field-of-view of the physical environment based on the gaze location and the distance to the object. The method includes obtaining, using the image sensor, an image corresponding to the field-of-view of the physical environment. The method includes extracting information from the image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or with which people can interact without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an electronic device equipped with a camera can perform image processing on images of a physical environment to realize various user experiences, including detecting machine-readable content, detecting objects, detecting user expressions, detecting activities, etc. Performing such image processing on the entire image can be computationally expensive. Accordingly, in various implementations, a portion of the image is selected and the image processing is performed on only the portion of the image. In various implementations, the portion of the image is selected based on a gaze location of the user and a distance to an object in the physical environment at the gaze location.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
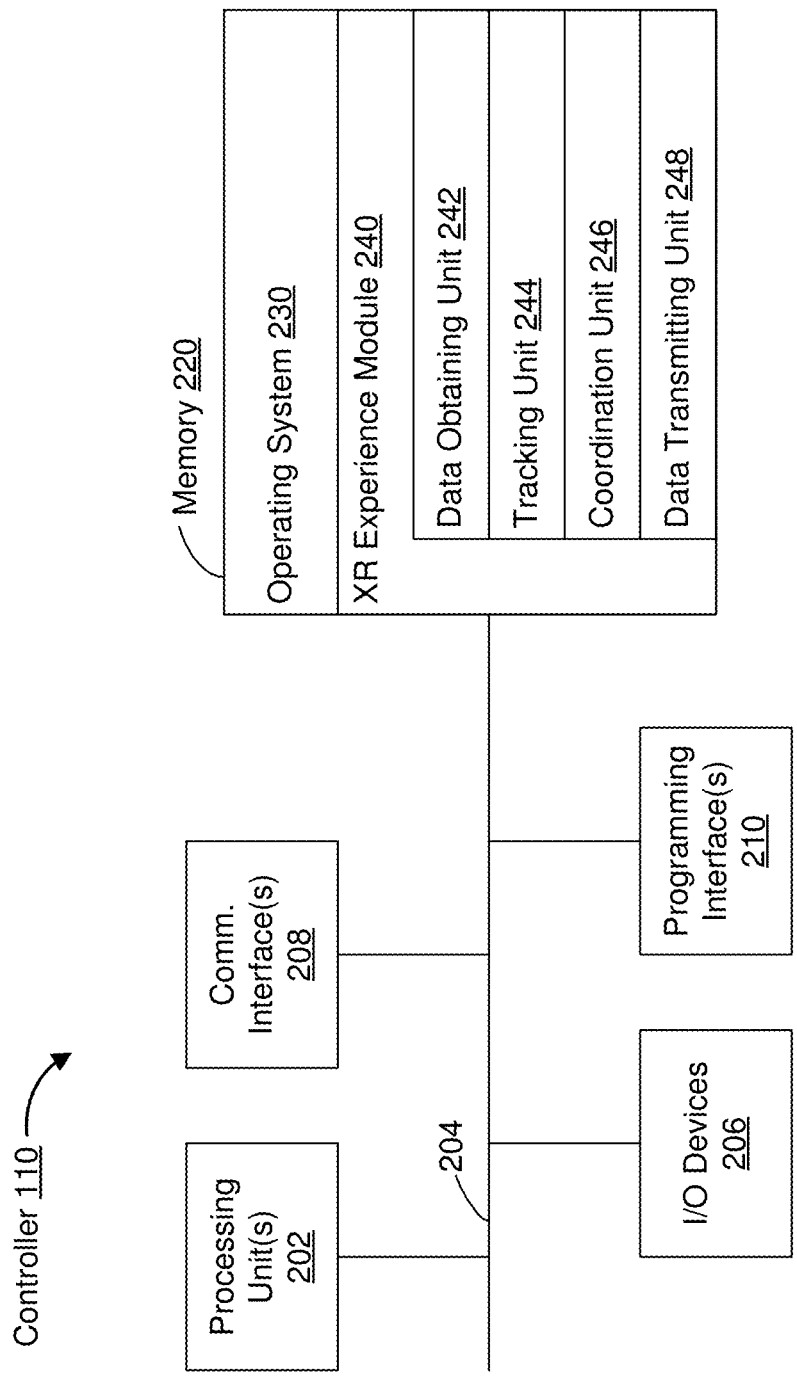
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
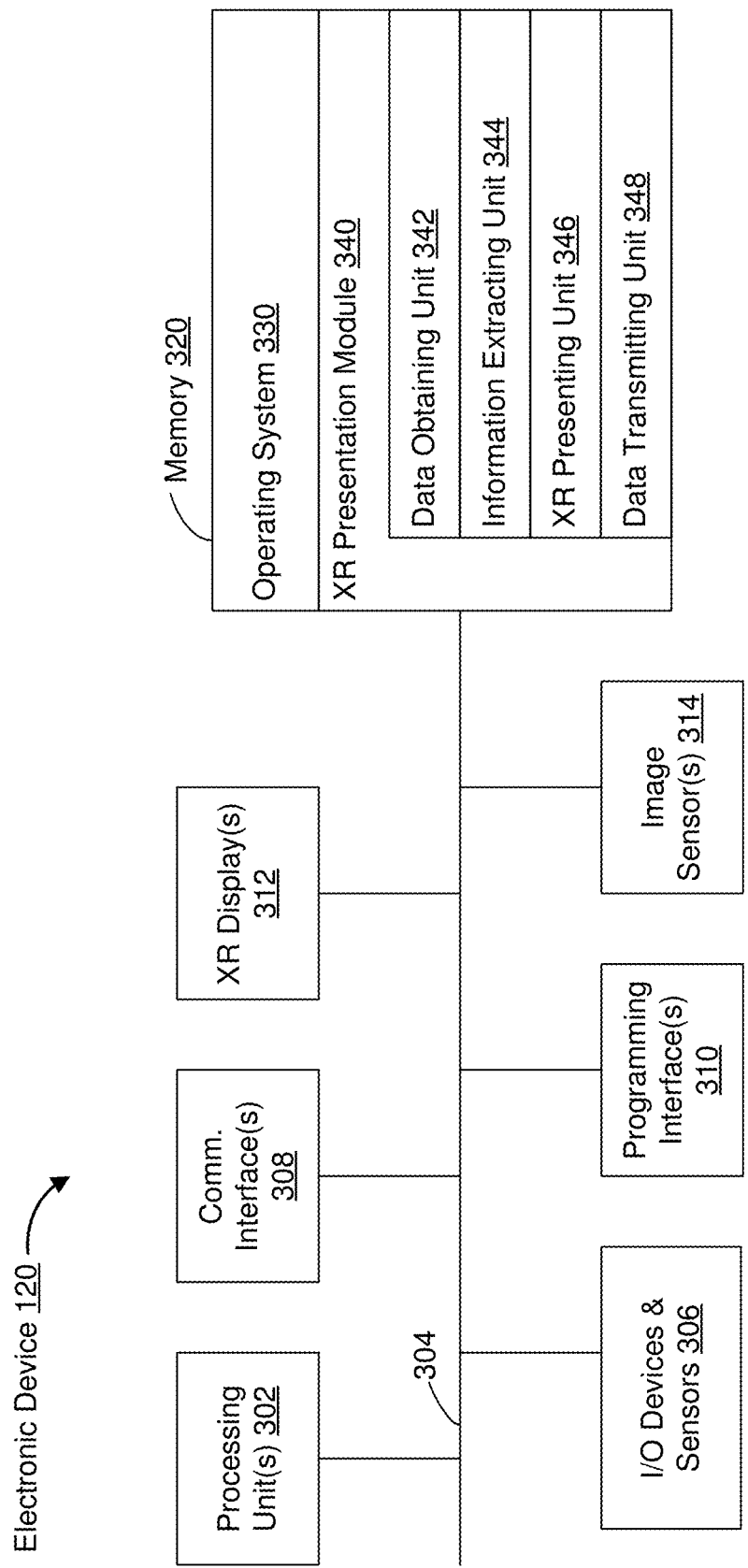
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an information extracting unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. In various implementations, the data obtaining unit 342 is configured to obtain data regarding actionable items detected in an image of an environment. To that end, in various implementations, the data obtaining unit 342 includes instructions and/or logic therefor, and heuristics and metadata therefor.

In some implementations, the information extracting unit 344 is configured to extract information from images of a physical environment. To that end, in various implementations, the information extracting unit 344 includes instructions and/or logic therefor, and heuristics and metadata therefor.

In some implementations, the XR presenting unit 346 is configured to present XR content via the one or more XR displays 312, such as alerts based on the extracted information. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the information extracting unit 344, the XR presenting unit 346, and the data transmitting unit 348 are shown as residing on a single device (e.g., the electronic device 120), it should be understood that in other implementations, any combination of the data obtaining unit 342, the information extracting unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4G illustrate an XR environment 400 presented, at least in part, by a display of an electronic device, such as the electronic device 120 of FIG. 3. The XR environment 400 is based on a physical environment in which the electronic device is present. FIGS. 4A-4G illustrate the XR environment 400 during a series of time periods in various implementations. In various implementations, each time period is an instant, a fraction of a second, a few seconds, a few hours, a few days, or any length of time.

FIGS. 4A-4G illustrate a gaze location indicator 499 that indicates a gaze location of the user, e.g., where in the XR environment 400 the user is looking. Although the gaze location indicator 499 is illustrated in FIGS. 4A-4G, in various implementations, the gaze location indicator 499 is not displayed by the electronic device.

Figure 4A:
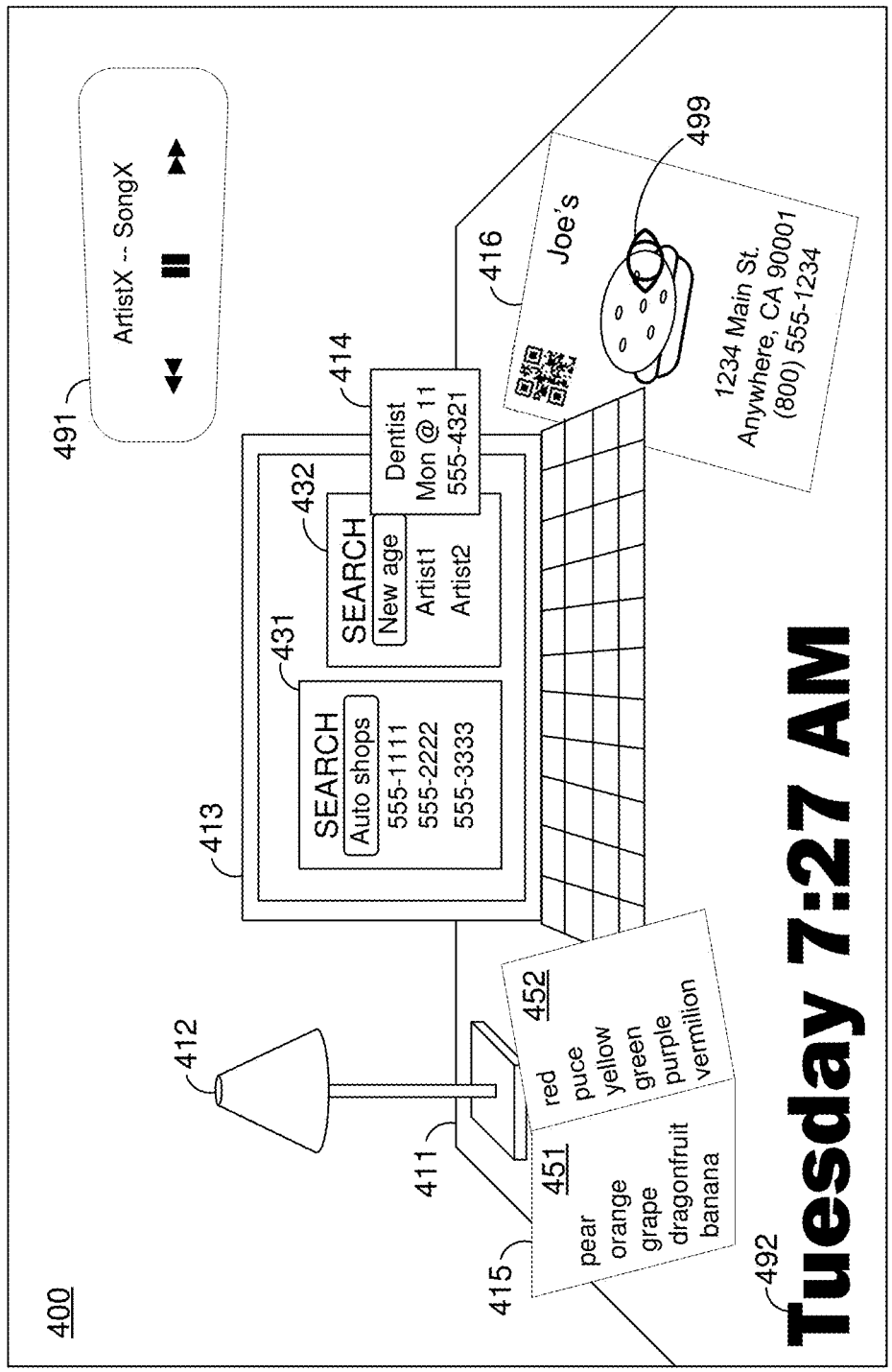
FIGS. 4A-4G illustrate an XR environment during various time periods in accordance with some implementations.

FIG. 4A illustrates the XR environment 400 during a first time period. The XR environment 400 is based on a physical environment of an office in which the electronic device is present.

The XR environment 400 includes a plurality of objects, including one or more physical objects (e.g., a desk 411, a lamp 412, a laptop 413, a sticky note 414, a book 415, and a takeout menu 416) of the physical environment and one or more virtual objects (e.g., a virtual media player window 491 and a virtual clock 492). In various implementations, certain objects (such as the physical objects and the virtual media player window 491) are presented at a location in the XR environment 400, e.g., at a location defined by three coordinates in a common three-dimensional (3D) XR coordinate system such that while some objects may exist in the physical world and others may not, a spatial relationship (e.g., distance or orientation) may be defined between them. Accordingly, when the electronic device moves in the XR environment 400 (e.g., changes either position and/or orientation), the objects are moved on the display of the electronic device, but retain their location in the XR environment 400. Such virtual objects that, in response to motion of the electronic device, move on the display, but retain their position in the XR environment 400 are referred to as world-locked objects. In various implementations, certain virtual objects (such as the virtual clock 492) are displayed at locations on the display such that when the electronic device moves in the XR environment 400, the objects are stationary on the display on the electronic device. Such virtual objects that, in response to motion of the electronic device, retain their location on the display are referred to display-locked objects.

In the XR environment 400, the lamp 412, the laptop 413, the book 415, and the takeout menu 416 sit atop the desk 411. Further, the sticky note 414 is attached to the laptop 413. The laptop 413 displays a first window 431 including search results for local automobile repair shops, including a phone number of a first auto shop, a phone number of a second auto shop, and a phone number of a third auto shop. The laptop 413 further displays a second window 432 including search results for artists of New Age music, including a name of a first artist and a name of a second artist.

The sticky note 414 has written thereon a reminder of a dentist's appointment including a time-and-date and a phone number of a dentist. The book 415 includes a first page 451 including a list of fruits and second page 452 including a list of colors. The takeout menu 416 includes an address of a restaurant, a phone number of the restaurant, and a QR code encoding the URL of a webpage of the restaurant.

The virtual media player window 491 indicates that the electronic device is playing a song entitled "SongX" by an artist named "ArtistX". The virtual clock 492 indicates a current day and time.

During the first time period, as indicated by the gaze location indicator 499 the user is looking at the takeout menu 416.

During the first time period, the electronic device scans the XR environment 400, e.g., by processing an image of physical environment, to extract information from the physical environment. In various implementations, extracting information from the physical environment includes detecting one or more actionable items, e.g., objects and/or information associated with respective actions using, e.g., computer-vision techniques such as a model trained to detect and classify various objects or to detect and interpret machine-readable content. For example, using object recognition, the electronic device detects the lamp 412 which is associated with an action of turning the lamp 412 on or off. As another example, using text recognition, in the first window 431 displayed by the laptop 413, the electronic device detects the phone number of the first auto shop which is associated with an action of calling the phone number of the first auto shop.

Figure 4B:
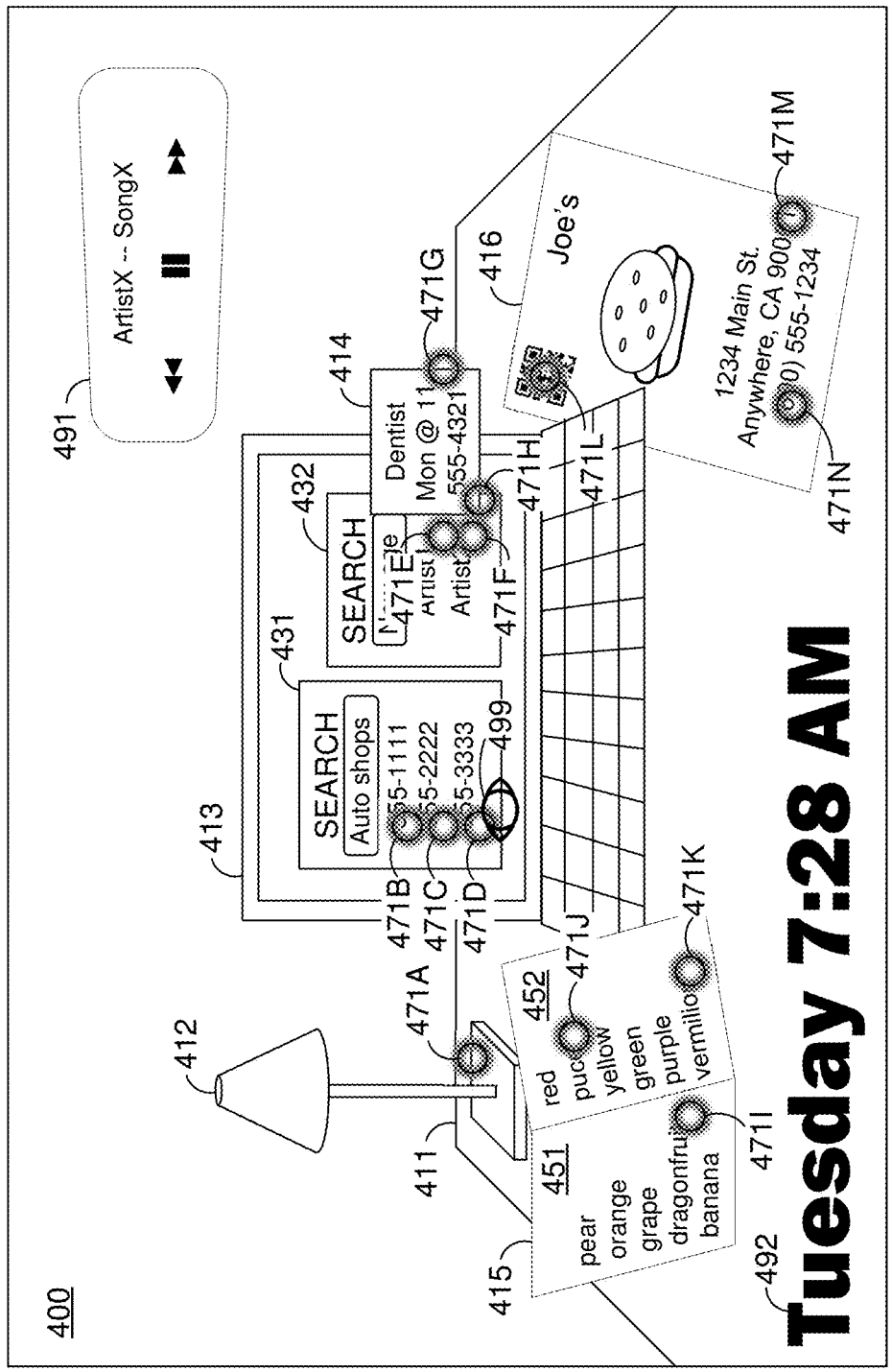

FIG. 4B illustrates the XR environment 400 in a full-scan implementation during a second time period subsequent to the first time period. In FIG. 4B, in response to detecting a plurality of actionable items associated with plurality of respective actions, the XR environment 400 includes a respective plurality of glints 471A-471N. Each of the plurality of glints 471A-471N indicates the detection of an actionable item in the XR environment 400.

A glint is a user interface element. In various implementations, performing the respective action includes displaying the glint. For example, in various implementations, the respective action includes displaying information associated with the actionable item and the glint includes the information. In various implementations, a glint is an affordance which, when selected, performs the respective action of the actionable item or, at least, displays an action affordance for performing the respective action. In various implementations, a glint is a world-locked virtual object presented in association with its respective actionable item. For example, in various implementations, a glint is a small glowing circle presented at a location in the environment proximate to the location of a detected actionable item.

In FIG. 4B, in response to detecting the lamp 412 which is associated with an action of turning the lamp 412 on or off, the XR environment 400 includes a first glint 471A. In response to detecting, in the first window 431 displayed by the laptop 413, the phone number of the first auto shop associated with an action of calling the phone number of the first auto shop, the XR environment 400 includes a second glint 471B. In response to detecting, in the first window 431 displayed by the laptop 413, the phone number of the second auto shop associated with an action of calling the phone number of the second auto shop, the XR environment 400 includes a third glint 471C. In response to detecting, in the first window 431 displayed by the laptop 413, the phone number of the third auto shop associated with an action of calling the phone number of the third auto shop, the XR environment 400 includes a fourth glint 471D.

In response to detecting, in the second window 432 displayed by the laptop 413, the name of the first artist associated with an action of playing music by the first artist, the XR environment 400 includes a fifth glint 471E. In response to detecting, in the second window 432 displayed by the laptop 413, the name of the second artist associated with an action of playing music by the second artist, the XR environment 400 includes a sixth glint 471F.

In response to detecting, on the sticky note 414, the time-and-date associated with an action of generating a calendar event for that time-and-date in a calendar application, the XR environment 400 includes a seventh glint 471G. In response to detecting, on the sticky note 414, the phone number of the dentist associated with an action of calling the phone number of the dentist, the XR environment 400 includes an eighth glint 471H.

In response to detecting, on the first page 451 of the book 415, the uncommon word "dragonfruit" associated with an action of displaying a dictionary definition or encyclopedia entry of the word, the XR environment 400 includes a ninth glint 471I. In response to detecting, on the second page 451 of the book 415, the uncommon word "puce" associated with an action of displaying a dictionary definition or encyclopedia entry of the word, the XR environment 400 includes a tenth glint 471J. In response to detecting, on the second page 452 of the book 415, the uncommon word "vermilion" associated with an action of displaying a dictionary definition or encyclopedia entry of the word, the XR environment 400 includes an eleventh glint 471K.

In response to detecting, on the takeout menu 416, the QR code associated with an action of opening the webpage having the URL encoded by the QR code, the XR environment 400 includes a twelfth glint 471L. In response to detecting, on the takeout menu 416, the address of the restaurant associated with an action of displaying a map of the address and/or directions to the address in a map application, the XR environment 400 includes a thirteenth glint 471M. In response to detecting, on the takeout menu 416, the phone number of the restaurant associated with an action of calling the phone number of the restaurant, the XR environment 400 includes a fourteenth glint 471N.

In various implementations, the respective action includes displaying information associated with the respective actionable item. For example, in various implementations, the action associated with the uncommon word "dragonfruit" is displaying a dictionary definition of the word. In various implementations, the associated glint (e.g., the ninth glint 471I) is not an affordance for displaying the dictionary definition, but is a user interface element that includes the dictionary definition. Thus, in various implementations, performing the action associated with the actionable item includes displaying the glint. In various implementations, the glint including the dictionary definition is not an affordance for performing a further action. In various implementations, the glint including the dictionary definition is an affordance for displaying an encyclopedia entry of the word.

In various implementations, different glints are generated by different applications executed by the electronic device. For example, in various implementations, the first glint 471A associated with the lamp 412 is generated by a smart home application. As another example, in various implementations, the ninth glint 471I, tenth glint 471J, and eleventh glint 471K associated with the book 415 are generated by a dictionary application. As another example, the fifth glint 471E and sixth glint 471F are generated by a music application.

In various implementations, different glints associated with different types of actions (e.g., generated by different applications) are displayed differently. In various implementations, the different glints are displayed with a different size, shape, or color. For example, in various implementations, the first glint 471A associated with the action of controlling a smart home device is displayed with a first color and the second glint 471B, third glint 471C, fourth glint 471D, eighth glint 471F, and fourteenth glint 471N each associated with calling a phone number are displayed with a second color.

In various implementations, different glints associated with different types of actions are displayed in association with their respective actionable items in different ways. For example, in various implementations, the ninth glint 471I, tenth glint 471J, and eleventh glint 471K each associated with the action of displaying a dictionary definition or encyclopedia entry of an uncommon word are displayed at the end of their respective words, allowing a user to read the entire word before deciding whether to select the glint to receive additional information. As another example in contrast, in various implementations, the second glint 471B, third glint 471C, fourth glint 471D, eighth glint 471F, and fourteenth glint 471N each associated with calling a phone number are displayed at the beginning of the respective phone number to obscure less informative information, such as an area code which may be common to many phone numbers in the field-of-view. As another example, in various implementations, the twelfth glint 471L associated with the action of opening a webpage having a URL encoded by a QR code is displayed centrally over the QR code so as to obscure human-unreadable information while minimizing obscuration of any other part of the field-of-view.

As noted above, in FIG. 4B, each of the plurality of glints 471A-471N is a user interface element which, when selected, performs the respective action of the actionable item or, at least, provides the user the option to perform the respective action. In various implementations, a user selects the glint by performing a hand gesture (e.g., a pinch-and-release gesture) at the location of the glint. In various implementations, the user selects the glint by looking at the glint and performing a head gesture, such as a nod, a wink, a blink, or an eye swipe (in which the gaze of the user swipes across the glint). In various implementations, the user selects the glint by looking at the glint and performing a hand gesture. In various implementations, the user selects the glint by looking at the glint and performing a vocal gesture (e.g., saying "open"). In various implementations, while a user is looking at a glint, the glint is displayed differently, e.g., bigger or brighter, to indicate that the user is looking at the glint.

During the second time period in the full-scan implementation, the user selects the fourth glint 471D. Accordingly, the gaze location indicator 499 indicates that the user is looking at the fourth glint 471D.

Figure 4C:
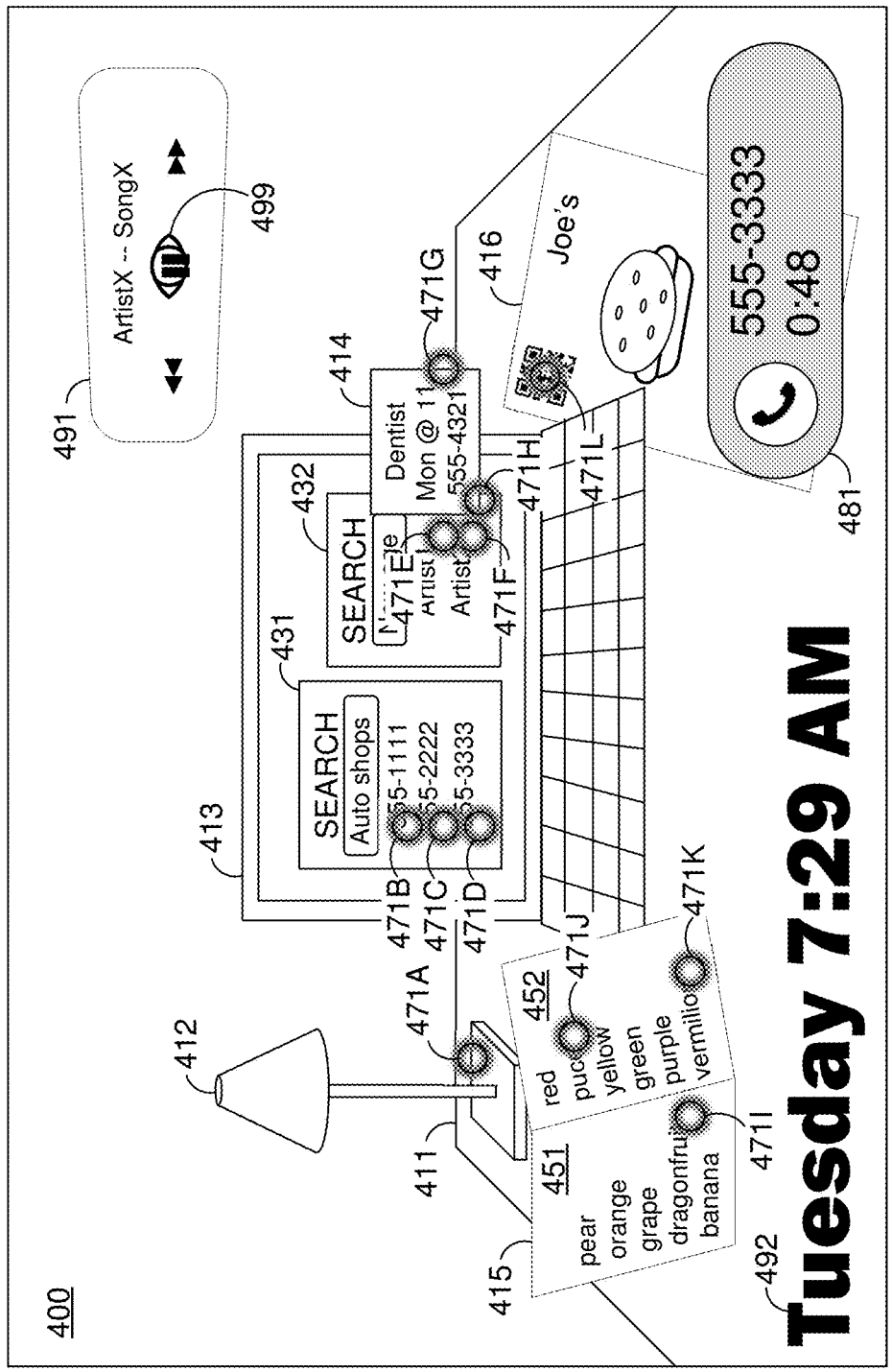

FIG. 4C illustrates the XR environment 400 in the full-scan implementation during a third time period subsequent to the second time period. In response to detecting selection of the fourth glint 471D, the electronic device performs the action associated with the fourth glint 471D, e.g., calling the phone number of the third auto shop. Accordingly, in FIG. 4C, the XR environment 400 includes an active call indicator 481 indicating that the user is engaged in a telephone call with the phone number of the third auto shop and has been for 48 seconds. In various implementations, the active call indicator 481 is a display-locked virtual object.

As illustrated in FIG. 4B and FIG. 4C, in a full-scan implementation, the image of the physical environment can include a large number of actionable items and require a large amount of image processing to detect the actionable items. Accordingly, rather than processing the entire image of the physical environment to extract information, in various implementations, the electronic device selects a portion of the image of the physical environment and extracts information from (e.g., detects actionable items in) the portion of the image.

In various implementations, the electronic device selects the portion of the image of the physical environment based on the gaze location of the user. In various implementations, the electronic device selects the portion of the image of the physical environment corresponding to an object in the physical environment at which a user is looking.

Figure 4D:
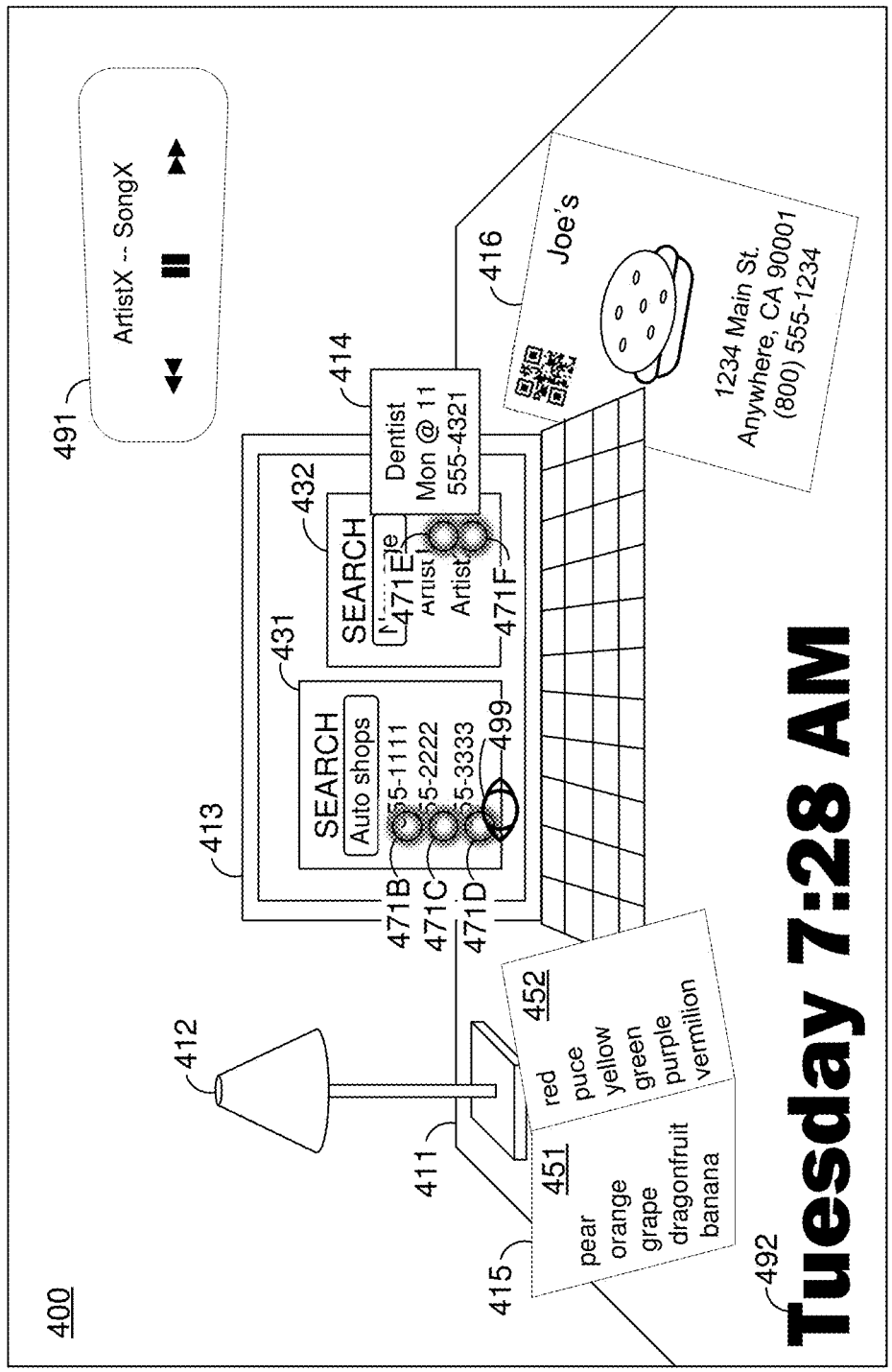

FIG. 4D illustrates the XR environment 400 in an object-scan implementation during the second time period. In FIG. 4D, as indicated by the gaze location indicator 499, the user is looking at the laptop 413. Accordingly, in FIG. 4D, the electronic device selects a portion of the image of the physical environment corresponding to the laptop 413. In various implementations, the portion of the image of the physical environment corresponding to the laptop 413 is determined using semantic segmentation or other object detection models. The electronic device detects actionable items in the portion of the image of the physical environment corresponding to the laptop 413 and displays glints in respective association with the detected actionable items. Thus, in FIG. 4D, in contrast to FIG. 4B, only the second glint 471B, the third glint 471C, the fourth glint 471D, the fifth glint 471E, and the sixth glint 471F are displayed.

Figure 4E:
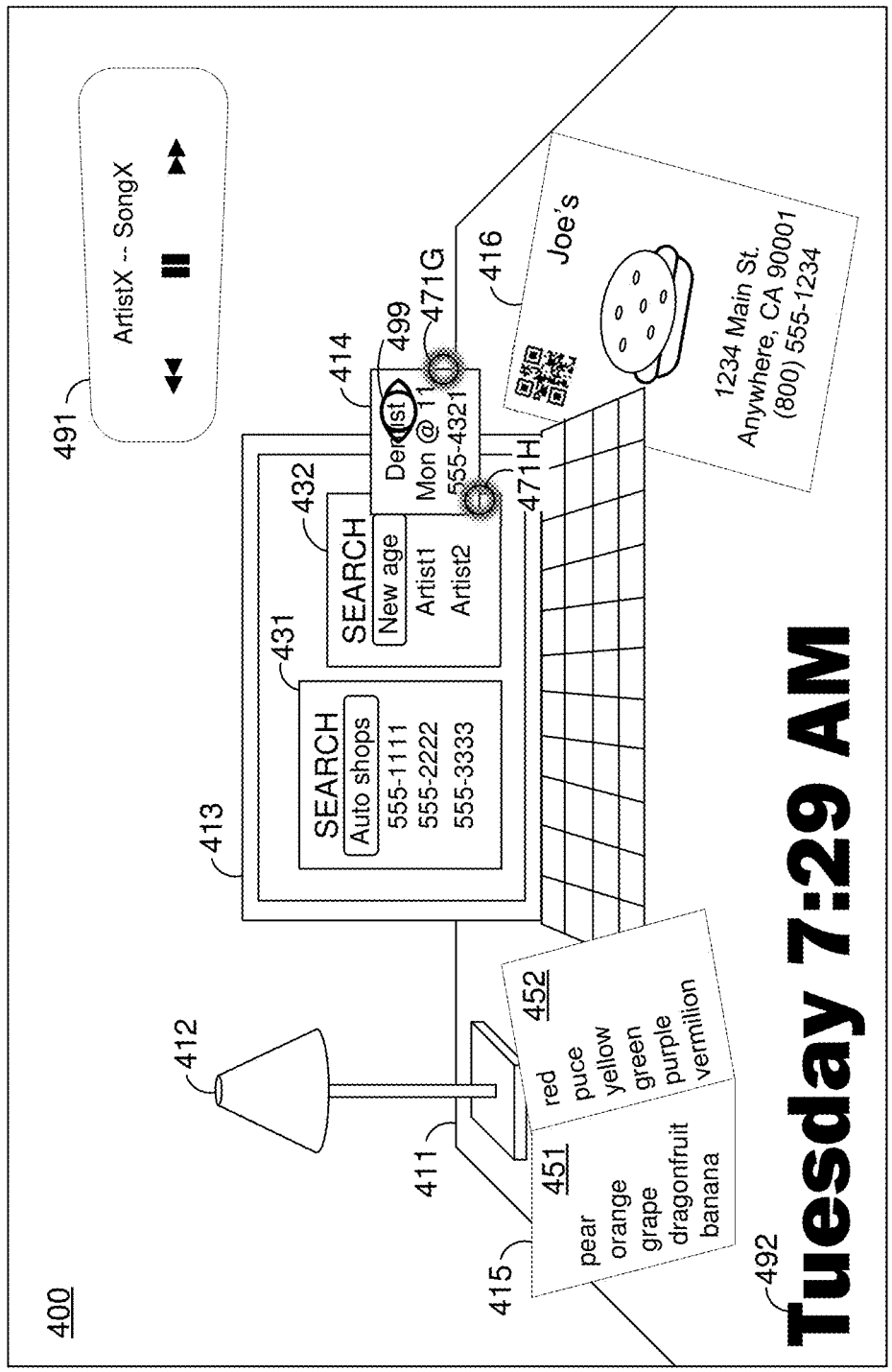

FIG. 4E illustrates the XR environment 400 in the object-scan implementation during the third time period. In FIG. 4E, as indicated by the gaze location indicator 499, the user is looking at the sticky note 414. Accordingly, in FIG. 4E, the electronic device selects a portion of the image of the physical environment corresponding to the sticky note 414, detects actionable items in the portion of the image of the physical environment corresponding to the sticky note 414, and displays glints in respective association with the detected actionable items. Thus, in FIG. 4E, in contrast to FIG. 4B, only the seventh glint 471G and eighth glint 471H are displayed.

In the object-scan implementation, although computation cost is reduced by extracting information from only a portion of the image of the physical environment, additional computation is required to select the portion of the image of the physical environment corresponding to the object at which the user is looking, e.g., to perform semantic segmentation or object detection.

Accordingly, in various implementations, the electronic device selects the portion of the image of the physical environment as an area surrounding the gaze location of the user. In various implementations, the size of the area is fixed. In various implementations, the size of the area is inversely related to a distance to the object at which the user is looking. For example, an object close to the user is likely to take up more of the field-of-view of the user (and be a larger portion of the image of the physical environment) than an object far from the user. Thus, by selecting the portion of the image of the physical environment as an area surrounding the gaze location of the user with a size based on the distance to the object at the gaze location of the user, the electronic device approximates the object-scan implementation without the additional computation of performing semantic segmentation or object detection.

Figure 4F:
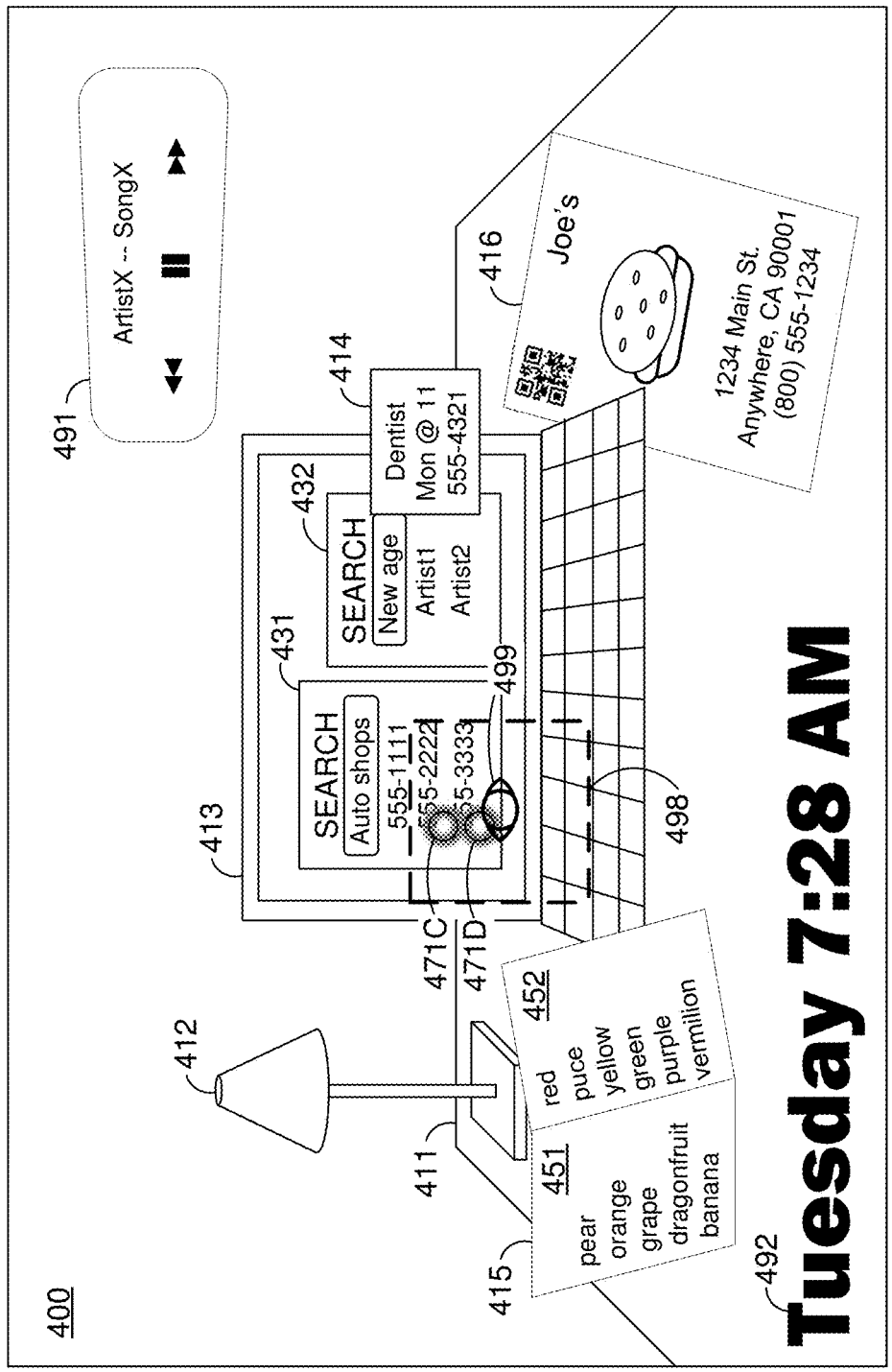

FIG. 4F illustrates the XR environment 400 in an area-scan implementation during the second time period. In FIG. 4D, as indicated by the gaze location indicator 499, the user is looking at the laptop 413 at a gaze location near the phone number of the third auto shop. Accordingly, in FIG. 4D, the electronic device selects a portion of the image of the physical environment corresponding to an area 498 surrounding the gaze location, detects actionable items in the portion of the image of the physical environment corresponding to the area 498 and displays glints in respective association with the detected actionable items. Thus, in FIG. 4D, in contrast to FIG. 4B, only the third glint 471C and the fourth glint 471D are displayed.

Figure 4G:
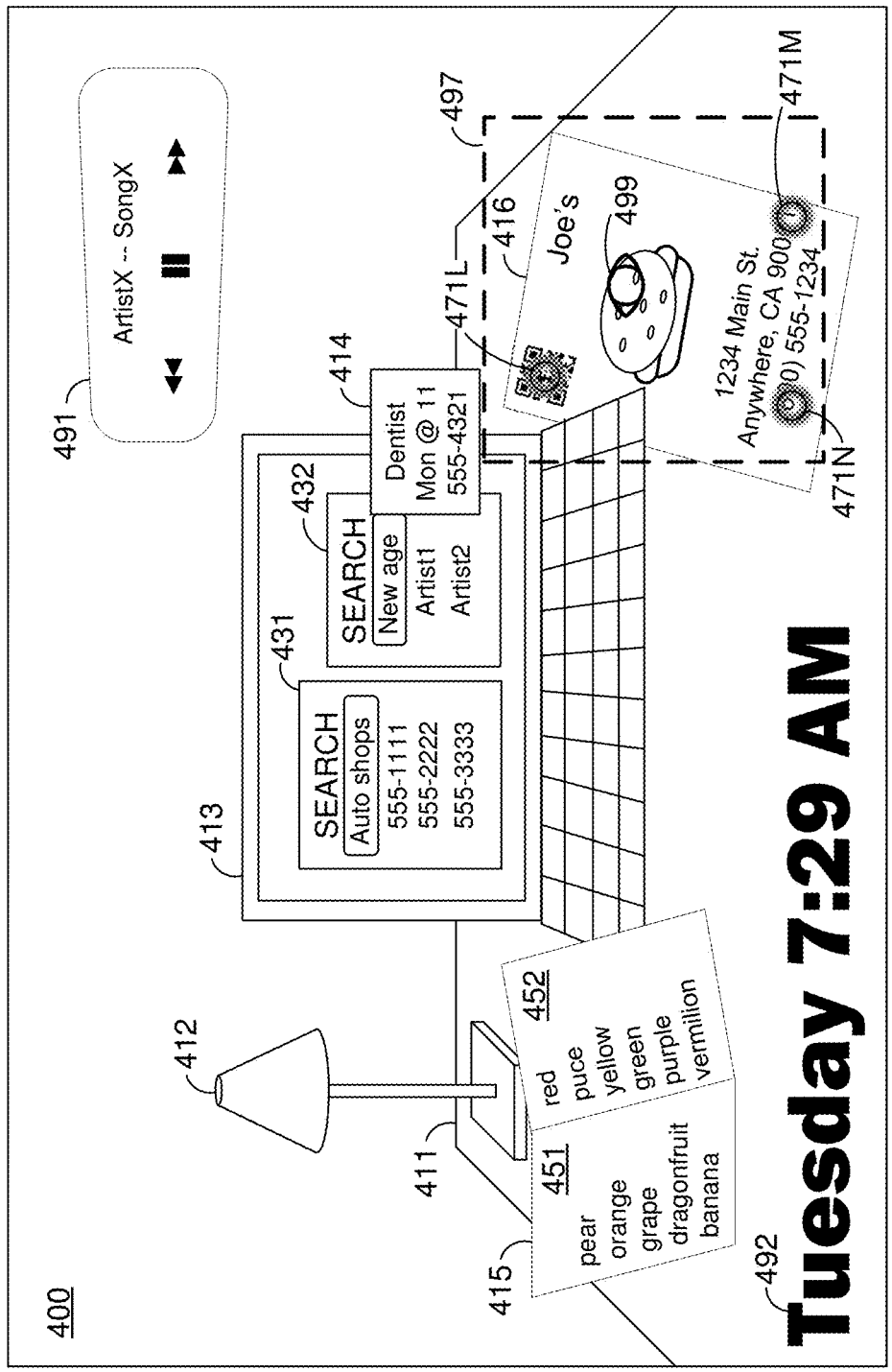

FIG. 4G illustrates the XR environment 400 in the area-scan implementation during the third time period. In FIG. 4E, as indicated by the gaze location indicator 499, the user is looking at the takeout menu 416 at a gaze location near an image on the takeout menu 416. Accordingly, in FIG. 4G, the electronic device selects a portion of the image of the physical environment corresponding to an area 497 surrounding the gaze location, detects actionable items in the portion of the image of the physical environment corresponding to the area 497 and displays glints in respective association with the detected actionable items. Thus, in FIG. 4D, in contrast to FIG. 4B, only the twelfth glint 471L, thirteenth glint 471M, and fourteenth glint 471N are displayed.

The distance to the gaze location on the takeout menu 416 in FIG. 4G is less than the distance to the gaze location on the laptop 413 in FIG. 4F. Accordingly, the area 497 in FIG. 4G is larger than the area 498 in FIG. 4F. For small angles, the size of an object in a field-of-view is inversely proportional to the distance to the object. Accordingly, in various implementations, a size (e.g., a length or a width) of the selected portion of the image of the environment is inversely proportional to the distance, capped at a minimum size at a first distance threshold (far from the user) and a maximum size at a second distance threshold (close to the user). While the area 497 in FIG. 4F (and the area 498 in FIG. 4G) are illustrated as rectangles, the areas can take any shape. Further, although the areas surround the gaze location, in various implementations, the areas may or may not be centered around the gaze location.

FIG. 5 is a flowchart representation of a method 500 of extracting information from an image of a physical environment in accordance with some implementations. In various implementations, the method 500 is performed by a device including an image sensor, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device determining a gaze location and a distance to an object in a physical environment at the gaze location. In various implementations, the gaze location is a gaze location of a user of the device and the gaze location of the user is determined by an eye tracker of the device. In various implementations, the distance to the object is determined by a depth sensor of the device. In various implementations, the distance to the object is determined using stereo depth estimation. In various implementations, the distance to the object is the distance to a location on the object corresponding to the gaze location.

In various implementations, e.g., if the device does not include gaze tracking, rather than determining the distance to the object at the gaze location, the device determines the distance to an object at a predetermined location within the field-of-view of the device, such as a location corresponding to the center of the display or a center of an image of the physical environment.

The method 500 continues, in block 520, with the device selecting a field-of-view of the physical environment based on the gaze location and the distance to the object.

In various implementations, the field-of-view surrounds the gaze location. For example, in FIG. 4F, the area 498 surrounds the gaze location indicator 499 in that the gaze location indicator is within the area 498. In various implementations, a center of the field-of-view corresponds to the gaze location. For example, in FIG. 4F, the gaze location indicator 499 is at the center of the area 498. In various implementations, a center of the field-of-view does not correspond to the gaze location indicator. For example, while the gaze location is moving, e.g., across or down a page while the user is reading, the field-of-view may be centered at a location the gaze location is shortly expected to be.

In various implementations, a size (e.g., a width, a height, or an area) of the field-of-view is inversely related to the distance to the object such that the size of the field-of-view decreases as the distance increases. In various implementations, the size of the field-of-view is inversely proportional to the distance, capped at a minimum size at a first distance threshold and a maximum size at a second distance threshold.

The method 500 continues, in block 530, with the device obtaining, using the image sensor, an image corresponding to the field-of-view of the physical environment. In various implementations, obtaining the image corresponding to the field-of-view of the physical environment includes obtaining, using the image sensor, an initial image and selecting a portion of the initial image as the image corresponding to the field-of-view. Thus, in various implementations, the initial image has a field-of-view greater than the selected field-of-view. Further, in various implementations, the selected portion of the initial image corresponds to the selected field-of-view based on the gaze location and the distance to the object.

In various implementations, the device includes multiple image sensors with different fields-of-view and the image sensor used to obtain the image corresponding to the field-of-view is selected based on the selected field-of-view. For example, if the distance to the object is greater, an image sensor with a smaller field-of-view is selected (e.g., an image sensor having a telephoto lens). Similarly, if the distance to the object is less, an image sensor with a larger field-of-view is selected (e.g., an image sensor having a wide or ultra-wide lens). Thus, in various implementations, obtaining the image corresponding to the field-of-view of the physical environment includes selecting the image sensor from a plurality of image sensors having different field-of-views and obtaining the image corresponding to the field-of-view using the selected image sensor.

In various implementations, the image sensor has a dynamically adjustable field-of-view and the device adjusts the field-of-view of the image sensor based on the selected field-of-view prior to capturing the image corresponding to the field-of-view. For example, if the distance to the object is greater, the device may adjust the field-of-view of the image sensor to be smaller. Thus, in various implementations, obtaining the image corresponding to the field-of-view of the physical environment includes adjusting a field-of-view of the image sensor prior to capturing the image.

The method 500 continues, in block 540, with the device extracting information from the image. In various implementations, when the image corresponding to the field-of-view is a portion of an initial image, the method 500 excludes extracting information from the remainder of the initial image. Thus, in various implementations, extracting information from the image excludes extracting information from portions of the initial image other than the selected portion of the initial image.

In various implementations, extracting information from the image includes detecting, and decoding, machine-readable content, such as text or a QR code. In various implementations, extracting information from the image includes detecting one or more objects. For example, in various implementations, extracting information from the image includes detecting an object-to-be-tracked, such as keys or a water bottle, for storing an indication that the object-to-be-tracked was detected in association with a time and location in a queryable database. In various implementations, extracting information from the image includes detecting a context. For example, in various implementations, extracting information from the image includes detecting an activity-to-be-tracked, such as hand-washing, for storing an indication that the activity-to-be-tracked was detected in association with a time and location in a queryable database.

In various implementations, extracting information from the image includes detecting one or more actionable items in the image. Each actionable item is associated with a respective action. In various implementations, the plurality of actionable items includes machine-readable content. Thus, in various implementations, detecting the one or more actionable items includes detecting machine-readable content in the portion of the image. In various implementations, the machine-readable content includes text, a one-dimensional barcode, or a two-dimensional barcode. For example, in FIG. 4B, the electronic device detects the text of the phone number of the first auto shop in the first window 431 displayed by the laptop 413, the text being associated with an action of calling the phone number of the first auto shop. As another example, in FIG. 4B, the electronic device detects the QR code printed on the takeout menu 416, the QR code being associated with an action of opening a website having a URL encoded by the QR code.

In various implementations, detecting the machine-readable content includes determining an alphanumeric string based on the machine-readable content. In various implementations, the alphanumeric string includes data in a particular recognizable format, such as a phone number, an address, or a URL. In various implementations, the alphanumeric string includes data that matches data in a database, such as words in a dictionary or names in a list of artists.

In various implementations, the one or more actionable items includes one or more objects. Thus, in various implementations, detecting the one or more actionable items includes detecting an object in the portion of the image. For example, in FIG. 4B, the electronic device detects the lamp 412 associated with an action of turning on or off the lamp 412.

In various implementations, the method 500 includes displaying one or more glints in respective association with the one or more actionable items. For example, in FIG. 4B, the electronic device displays the first glint 471A in association with the lamp 412 and the second glint 471B in association with the phone number of the first auto shop.

In various implementations, method 500 includes detecting input directed to a particular glint of the one or more glints associated with a particular actionable item of the one or more actionable items and performing an action association with the particular actionable item. For example, in FIG. 4B, the electronic device detects input directed to the fourth glint 471D and, in FIG. 4C, the electronic device displays the active call indicator 481 indicating that the user is engaged in a telephone call with the phone number of the third auto shop.

In various implementations, performing the action associated with the particular actionable item includes displaying content relating to the particular actionable item. For example, in response to selection of the ninth glint 471I, the electronic device displays a dictionary definition of the word "dragonfruit". In various implementations, performing the action associated with the particular actionable item includes changing a state of the particular actionable item. For example, in response to selection of the first glint 471A, the electronic device turns the lamp 412 on or off.

Whereas, for ease of illustration and description, some of the drawings and corresponding description are based on a single image sensor and a single two-dimensional display, the methods described herein, including the method 500 of FIG. 5, can similarly be performed with stereo cameras and stereo displays. For example, in various implementations, in block 530, the device obtains two images (from two image sensors having two different perspectives) corresponding to the selected field-of-view. Due to the different perspectives of the two image sensors, the two images may be two different portions (at different locations) of two initial images obtained by the two image sensors. Further, in various implementations, in block 540, the device extracts information from one or both of the two images.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including an image sensor, one or more processors, and non-transitory memory:
   determining a gaze location and a distance from the device to an object in a physical environment at the gaze location;
   selecting a field-of-view of the physical environment from the device based on the gaze location and the distance from the device to the object, wherein a size of the field-of-view is a first size at a first distance and the size of the field-of-view is a second size less than the first size at a second distance greater than the first distance;
   obtaining, using the image sensor, an image corresponding to the field-of-view; and
   extracting information from the image.

2. The method of claim 1, wherein obtaining the image corresponding to the field-of-view includes obtaining, using the image sensor, an initial image and selecting a portion of the initial image as the image corresponding to the field-of-view.

3. The method of claim 2, wherein extracting information from the image excludes extracting information from portions of the initial image other than the selected portion of the initial image.

4. The method of claim 1, wherein obtaining the image corresponding to the field-of-view includes selecting the image sensor from a plurality of image sensors having different field-of-views.

5. The method of claim 1, wherein obtaining the image corresponding to the field-of-view includes adjusting a field-of-view of the image sensor prior to capturing the image.

6. The method of claim 1, wherein the field-of-view surrounds the gaze location.

7. The method of claim 1, wherein a size of the field-of-view is inversely related to the distance from the device to the object.

8. The method of claim 7, wherein the size of the field-of-view is inversely proportional to the distance from the device to the object, capped at a minimum size at a first distance threshold and a maximum size at a second distance threshold.

9. The method of claim 1, wherein extracting information from the image includes detecting one or more actionable items in the image.

10. The method of claim 9, wherein detecting the one or more actionable items includes detecting machine-readable content in the image.

11. The method of claim 9, wherein detecting the one or more actionable items includes detecting an object in the image.

12. The method of claim 9, further comprising displaying one or more glints in respective association with the one or more actionable items.

13. The method of claim 12, further comprising:
   detecting input directed to a particular glint of the one or more glints associated with a particular actionable item of the one or more actionable items; and
   performing an action associated with the particular actionable item.

14. The method of claim 13, wherein performing the action associated with the particular actionable item includes displaying content relating to the particular actionable item.

15. The method of claim 13, wherein performing the action associated with the particular actionable item includes changing a state of the particular actionable item.

16. A device comprising:
   an image sensor;
   a non-transitory memory; and
   one or more processors to:
   determine a gaze location and a distance from the device to an object in a physical environment at the gaze location;
   select a field-of-view of the physical environment from the device based on the gaze location and the distance from the device to the object, wherein a size of the field-of-view is a first size at a first distance and the size of the field-of-view is a second size less than the first size at a second distance greater than the first distance;
   obtain, using the image sensor, an image corresponding to the field-of-view of the physical environment; and
   extract information from the image.

17. The device of claim 16, wherein the field-of-view surrounds the gaze location.

18. The device of claim 16, wherein the one or more processors are to extract information from the image by detecting one or more actionable items in the image.

19. The device of claim 18, wherein the one or more processors are further to display one or more glints in respective association with the one or more actionable items.

20. A non-transitory memory storing one or more programs, which, when executed by one or more processors of a device including an image sensor, cause the device to:
- determine a gaze location and a distance from the device to an object in a physical environment at the gaze location;
- select a field-of-view of the physical environment from the device based on the gaze location and the distance from the device to the object, wherein a size of the field-of-view is a first size at a first distance and the size of the field-of-view is a second size less than the first size at a second distance greater than the first distance;
- obtain, using the image sensor, an image corresponding to the field-of-view of the physical environment; and
- extract information from the image.

\* \* \* \* \*